United States Patent
Minami

(10) Patent No.: US 10,544,301 B2
(45) Date of Patent: Jan. 28, 2020

(54) BIODEGRADABLE POLYESTER RESIN COMPOSITION AND MOLDED ARTICLE FORMED FROM SAID RESIN COMPOSITION

(71) Applicant: KANEKA CORPORATION, Osaka-shi (JP)

(72) Inventor: Tetsuya Minami, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 1 day.

(21) Appl. No.: 16/076,206

(22) PCT Filed: Jan. 30, 2017

(86) PCT No.: PCT/JP2017/003228
§ 371 (c)(1),
(2) Date: Aug. 7, 2018

(87) PCT Pub. No.: WO2017/138392
PCT Pub. Date: Aug. 17, 2017

(65) Prior Publication Data
US 2019/0359818 A1  Nov. 28, 2019

(30) Foreign Application Priority Data
Feb. 9, 2016 (JP) .................. 2016-023108

(51) Int. Cl.
| C08L 67/02 | (2006.01) |
| C08L 67/04 | (2006.01) |
| C08K 3/36 | (2006.01) |
| C08K 5/092 | (2006.01) |
| C08K 5/1515 | (2006.01) |
| C08K 5/053 | (2006.01) |

(52) U.S. Cl.
CPC .............. *C08L 67/02* (2013.01); *C08K 3/36* (2013.01); *C08K 5/053* (2013.01); *C08K 5/092* (2013.01); *C08K 5/1515* (2013.01); *C08L 67/04* (2013.01); *C08K 2201/018* (2013.01); *C08L 2201/06* (2013.01)

(58) Field of Classification Search
CPC .......... C08L 67/00; C08L 67/02; C08L 67/04; C08L 2201/06; C08K 5/053; C08K 5/092; C08K 5/1515; C08K 2201/018
See application file for complete search history.

(56) References Cited

U.S. PATENT DOCUMENTS

| 2015/0210801 | A1 | 7/2015 | Abe et al. |
| 2015/0232660 | A1 | 8/2015 | Okura et al. |
| 2015/0353707 | A1* | 12/2015 | Suzuki ................ C08J 3/20 524/387 |
| 2016/0060451 | A1* | 3/2016 | Schmidt ............. C08L 67/02 524/47 |
| 2016/0251494 | A1 | 9/2016 | Koyama et al. |

FOREIGN PATENT DOCUMENTS

| CA | 2 834 651 A1 | 11/2012 | |
| JP | 2000-239508 A | 9/2000 | |
| JP | 2010-132816 A | 6/2010 | |
| JP | 2013-155223 A | 8/2013 | |
| JP | 2014-517103 A | 7/2014 | |
| JP | 2014-162799 A | 9/2014 | |
| JP | 2015-52045 A | 3/2015 | |
| WO | WO 2014/020838 A1 | 2/2014 | |
| WO | WO 2014/054276 A1 | 4/2014 | |
| WO | WO-2014112008 A1 * | 7/2014 | ......... B29C 45/0001 |
| WO | WO-2014166938 A1 * | 10/2014 | |
| WO | WO 2015/052876 A1 | 4/2015 | |

OTHER PUBLICATIONS

International Search Report dated Feb. 21, 2017, in PCT/JP2017/003228 filed Jan. 30, 2017.

* cited by examiner

*Primary Examiner* — Christopher M Rodd
(74) *Attorney, Agent, or Firm* — Oblon, McClelland, Maier & Neustadt, L.L.P.

(57) ABSTRACT

A biodegradable polyester resin composition containing 30 to 60 parts by weight of (A) a polylactic acid, 25 to 45 parts by weight of (B) a poly-3-hydroxyalkanoate, and 5 to 25 parts by weight of (C) an aliphatic-aromatic polyester, based on 100 parts by weight in total of (A) the polylactic acid, (B) the poly-3-hydroxyalkanoate and (C) the aliphatic-aromatic polyester. The biodegradable polyester resin composition further contains 0.05 to 20 parts by weight: of (D) pentaerythritol, 10 to 40 parts by weight of (E) a silicate, and 0 to 3 parts by weight of (F) a compatibilizer having an epoxy group, relative to 100 parts by weight in total of (A) the polylactic acid, (B) the poly-3-hydroxyalkanoate, and (C) the aliphatic-aromatic polyester.

20 Claims, No Drawings

BIODEGRADABLE POLYESTER RESIN COMPOSITION AND MOLDED ARTICLE FORMED FROM SAID RESIN COMPOSITION

TECHNICAL FIELD

The present invention relates to a biodegradable polyester resin composition and a molded article formed from said resin composition.

BACKGROUND ART

Large amounts of petrolatum-derived plastics are disposed every year, and serious problems caused by the large amounts of wastes, such as shortage of landfills and environment pollution, have been discussed Under the circumstances, attention has been down by biodegradable plastics, which are degraded by the action of microorganisms in environments, in landfills, or in composts. Biodegradable plastics are under development with the aim of expanding their application to materials for use in the aforementioned environments agriculture, forestry, and fisheries, and also to food containers, packaging materials, sanitary materials, garbage bags, etc., which are difficult to recover/recycle after use.

Particularly, from the viewpoint of carbon dioxide emission reduction or carbon dioxide fixation (carbon neutral), polyhydroxyalkanoates (PHAs), which are plant-derived biodegradable polyesters have been drawing attention. Especially; polylactic acids (PLAs) have been drawing attention because lactic acid, which is the raw material of the polylactic acids, is inexpensive for the reason that it is produced by fermentation using sugars extracted from corn, potato, or the like, and also because the resins are inherently high in rigidity and also high in transparency.

However, such a polylactic acid is problematic in, for example, that it is insufficient in heat resistance because the glass transition temperature thereof is around 55° C. and that the application thereof is limited because it is low in ductility and toughness. In addition, since the crystallization speed of the polylactic acid is slow, it takes a long time for the polylactic acid to be crystallized completely even if it is kept around 100° C., at which its crystallization is most likely to advance. Thus, there is also a problem of poor productivity.

PTL 1 proposes a method of blending a polylactic acid with a resin other than the polylactic acid and a soluble azo lake as a crystal nucleating agent in order to improve heat resistance and processability. However, the biodegradability is not sufficiently high and substantially no high effect has been obtained because a resin other than biodegradable resins is blended.

PTL 2 proposes a method of blending a polylactic acid, a poly-3-hydroxybutyric acid, an inorganic filler, and a crystal nucleating agent in order to obtain a resin material for the low warpage articles being excellent in mechanical performance and biodegradability. However, in order to increase the heat resistance, it is necessary to increase the percentage of the poly-3-hydroxybutyric acid, which leads to a problem that molding issues such as burrs tend to occur.

PTL 3 discloses a biodegradable polyester film made of a polylactic acid and a biodegradable polyester based on an aliphatic dicarboxylic acid, an aromatic dicarboxylic acid, and an aliphatic dihydroxy compound, and the like. According to the patent literature, a film excellent in tear strength can be obtained, but the film is not satisfactory in heat resistance.

CITATION LIST

Patent Literature

PTL 1: JP-A-2010-132816
PTL 2: JP-A-2000-239508
PTL 3: JP-T-2014-517103

SUMMARY OF INVENTION

Technical Problem

An object of the present invention is to provide a biodegradable polyester resin composition that improves heat resistance, ductility, toughness, and processability, which are faults of a polylactic acid, and that is capable of suppressing the formation of burrs, which is one of the faults of a poly-3-hydroxyalkanoate, and a molded article formed from said resin composition.

Solution to Problem

As a result of extensive studies to improve the heat resistance, ductility, toughness, and processability of a polylactic acid, the present inventors have found that the heat resistance, the ductility, and the toughness are improved and the processability can be improved by blending a polylactic acid with poly-3-hydroxyalkanoate (P3HA), an aliphatic-aromatic polyester, pentaerythritol, a silicate, and, if necessary, a compatibilizer having an epoxy group, and the present invention has thereby been accomplished.

That is, the present invention provides biodegradable polyester resin compositions and a biodegradable polyester resin molded article of the following [1] to [5].

[1] A biodegradable polyester resin composition containing 30 parts by weight or more and 60 parts by weight or less of (A) a polylactic acid, 25 parts by weight or more and 45 parts by weight or less of (B) a poly-3-hydroxyalkanoate and 5 parts by weight or more and 25 parts by weight or less of (C) an aliphatic-aromatic polyester based on 100 parts by weight in total of the three components, (A) the polylactic acid, (B) the poly-3-hydroxyalkanoate, and (C) the aliphatic-aromatic polyester, and further containing 0.05 part by weight or more and 20 parts by weight or less of (D) pentaerythritol, 10 parts by weight or more and 40 parts by weight or less of (E) a silicate, and 0 part by weight or more and 3 parts by weight or less of (F) a compatibilizer having an epoxy group relative to 100 parts by weight in total of the three components, (A) the polylactic acid, (B) the poly 3-hydroxyalkanoate, and (C) the aliphatic-aromatic polyester.

[2] The biodegradable polyester resin composition according to the above [11, in which (E) the silicate is composed of at least one species selected from talc, mica, kaolinite, montmorillonite, and smectite.

[3] The biodegradable polyester resin composition according to the above (1] or (21, in which (C) the aliphatic-aromatic polyester has a melting point of 100 to 130° C. and is composed of at least one species selected from polybutylene adipate terephthalate, polybutylene sebacate terephthalate, polybutylene azelate terephthalate, and polybutylene succinate terephthalate.

[4] The biodegradable polyester resin composition according to any one of the above [1] to [3], in which (B) the poly-3-hydroxyalkanoate is composed of at least one species selected from poly(3-hydroxybutyrate), poly-(3-hydroxybutyrate-co-3-hydroxyvalerate), poly(3-hydroxybutyrate-hydroxyvalerate-co-3-hydroxyhexanoate), poly(3-hydroxybutyrate-co-3-hydroxyhexanoate), and poly(3-hydroxybutyrate-co-4-hydroxybutyrate).

[5] A biodegradable polyester resin molded article produced by melting the biodegradable polyester resin composition according to any one of the above [1] to [4] and molding it at 25 to 55° C.

Advantageous Effects of Invention

According to the present invention, heat resistance, ductility, and toughness, which are faults of molded articles formed from a polylactic acid, are improved, and processability in injection molding, extrusion molding, etc. is improved, and molding issues such as burrs are less likely to occur.

DESCRIPTION OF EMBODIMENTS

In the following, some examples of embodiments of the biodegradable polyester resin composition of the present invention will be described in detail, but the present invention is not limited thereto.

[Biodegradable Polyester Resin Composition]

The biodegradable polyester resin composition of the present invention is a biodegradable polyester resin composition that contains (A) a polylactic acid, (B) a poly-3-hydroxyalkanoate, (C) an aliphatic-aromatic polyester, (D) pentaerythritol, (E) a silicate, and, if necessary, further contains (F) a compatibilizer having an epoxy group.

The biodegradable polyester resin composition of the present invention containing (A) a polylactic acid, (B) a poly-3-hydroxyalkanoate, (C) an aliphatic-aromatic polyester, (D) pentaerythritol, (E) a silicate, and, if necessary, further containing (F) a compatibilizer having an epoxy group has excellent processability which cannot be obtained with a resin composition containing a conventional polyhydroxyalkanoate resin, and therefore, when processing it to form a molded article, it is possible to set the molten resin temperature, or the temperature and the period of cooling in a mold in wide ranges. The resin composition has excellent processing characteristics in such respects.

In the following, (A) the polylactic acid, (B) the poly-3-hydroxyalkanoate, (C) the aliphatic-aromatic polyester, (D) the pentaerythritol, (E) the silicate, and (F) the compatibilizer having an epoxy group are described.

[(A) Polylactic Acid]

The polylactic acid disclosed herein is composed of at least one species selected from polylactic acids containing repeat units represented by the following formula (1).
[Chemical Formula 1]

 Formula (1)

The polylactic acid used for the biodegradable polyester resin composition disclosed herein preferably has the repeat units of the above formula (1) in an amount of 50 mol % or more of all repeat units of the above formula (I) and may contain other repeat structures.

The polylactic acid may be poly(D-lactic acid), poly(L-lactic acid), a copolymer of D-lactic acid and L-lactic acid, or a stereo-complex thereof, which is a blend thereof.

The molecular weight of the polylactic acid disclosed herein is not particularly limited as long as the polylactic acid exhibits substantially satisfactory physical properties for the intended use. However; when the molecular weight is low, a molded article to be obtained has a lowered strength. Conversely if the molecular weight is high, the processability deteriorates and it is difficult to form a molded article. In view of such circumstances, the weight-average molecular weight of the polylactic acid disclosed herein is preferably in the range of 50,000 or more and 300,000 or less, and more preferably in the range of 100,000 or more and 250,000 or less.

The weight-average molecular weight of the polylactic acid is determined from a molecular weight distribution in terms of polystyrene standards that is measured by using gel permeation chromatography (GPC) using a chloroform solution. A column used in the GPC may be any column suitable for measuring the molecular weight range above.

As the polylactic acid disclosed herein, commercially available polylactic acids can be used, and specifically for example, "geo" (registered trademark) available from NatureWorks LLC, "REVODE" (registered trademark) available from Zhejiang Hisun. Biomaterials Co., Ltd., and products available from Corbion can be used.

Regarding the amount (content) of the polylactic acid used in the biodegradable polyester resin composition disclosed herein, the lower limit thereof is 30 parts by weight or more, preferably 40 parts by weight or more, based on 100) parts by weight of the total amount (A+B+C) of the three components, (A) the polylactic acid, (B) the poly-3-hydroxyalkanoate, and (C) the aliphatic-aromatic polyester in respect that the resin composition is excellent in the effect of suppressing the formation of burrs of a molded article to be obtained. On the other hand, in respect that a molded article to be obtained is excellent in heat resistance, the upper limit is 60 parts by weight or less, preferably 50 parts by weight or less, based on 100 parts by weight of the total amount (A+B+C) of the three components, (A) the polylactic acid, (B) the poly-3-hydroxyalkanoate, and (C) the aliphatic-aromatic polyester.

[(B) Poly-3-hydroxyalkanoate]

The poly-3-hydroxyalkanoate disclosed herein is preferably composed of one or more species selected from poly-3-hydroxyalkanoates produced from microorganisms and containing a repeat unit represented by the following formula (2)
[Chemical Formula 2]

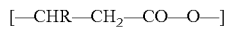 Formula(2)

wherein R is an alkyl group represented by $C_nH_{2n+1}$, and n is an integer of 1 or more and 15 or less.

The poly-3-hydroxyalkanoate used for the biodegradable polyester resin composition disclosed herein is just required to contain the repeat unit of the above formula (2) in an amount of 50 mol % or more of all repeat units, and may further contain other repeat structures.

Additionally, common polyhydroxyalkanoates (PHAs) include PHAs obtainable through chemical synthesis in addition to the microorganism-produced PHAs, which are produced from microorganisms. In the microorganism-produced PHAs, their structural unit (monomer structural unit) is only a D-form (R-form) and therefore they are optically active, whereas in the PHA obtainable through chemical synthesis, structural units (monomer structural units) derived from a D-form (R-form) and an L-form (S-form) are bonded randomly and therefore they are optically inactive.

The microorganism that produces the poly-3-hydroxyalkanoate is not particularly limited as long as it is a microorganism having an ability to produce poly-3-hydroxyalkanoates. For example, *Bacillus megaterium* is the first discovered poly(3-hydroxybutyrate)(P3HB)-producing microorganism, which was discovered in 1925, and natural microorganisms such as *Cupriavidus necator* (formerly classified as *Alcaligenes eutrophus, Ralstonia eutropha*) and *Alcaligenes latus* are known as other P3HB-producing microorganisms. These microorganisms accumulate P3HB in their cells.

Further, known microorganisms that produce copolymers of hydroxybutyrate and another hydroxyalkanoate are, for example, *Aeromonas caviae*, which produces poly(3-hydroxybutyrate-co-3-hydroxyvalerate) (P3HB3HV) and poly(3-hydroxybutyrate-co-3-hydroxyhexanoate) (P3HB3HH), and *Alcaligenes eutrophus*, which produces poly(3-hydroxybutyrate-co-4-hydroxybutyrate) (P31B4HB). Especially regarding P3HB3HH, more preferred is, for example, *Alcaligenes eutrophus* AC32, FERM BP-6038 (T. Fukui, Y Dol, J. Baterio, 179, p. 4821.-4830 (1997)), in which a poly-3-hydroxyalkanoate synthase gene is introduced to improve P3HB3H1H productivity There are used microorganism cells in which P3HB3HH has been accumulated by culturing such microorganisms under proper conditions. Besides the above microorganisms, genetically-modified microorganisms may also be used, in which various poly-3-hydroxyalkanoate synthesis-related genes are introduced in accordance with the intended type of poly-3-hydroxyalkanoate to be produced, and culture conditions including the type of a substrate may be optimized.

The poly-3-hydroxyalkanoate to be used for the biodegradable polyester resin composition disclosed herein is not particularly limited with respect to its molecular weight as long as it substantially exhibits sufficient physical properties for the intended use. However, when the molecular weight is low; a molded article to be obtained has a lowered strength. Conversely, if the molecular weight is high, the processability deteriorates and it is difficult to for a molded article. In view of such circumstances, the weight-average molecular weight of the poly-3-hydroxyalkanoate disclosed herein is preferably in the range of 200,000 or more and 2,500,000 or less, more preferably in the range of 250,000 or more and 2,000,000 or less, and even more preferably in the range of 300,000 or more and 1,000,000 or less.

The weight-average molecular weight of the poly-3-hydroxyalkanoate is determined from a molecular weight distribution in terms of polystyrene standards that is measured by using gel permeation chromatography (GPC) using a chloroform solution. A column used in the GPC may be any column suitable for measuring the molecular weight range above.

The poly-3-hydroxyalkanoate to be used for the biodegradable polyester resin composition disclosed herein is preferably a polymeric resin containing 80 mol % or more, more preferably 85 mol % or more, of 3-hydroxybutyrate, and such materials produced by microorganisms are preferred. Specific examples thereof include poly(3-hydroxybutyrate), poly-3-hydroxybutate-co-3-hydroxypropionate), poly(3-hydroxybutyrate-co-3-hydroxyvalerate), poly(3-hydroxybutyrate-co-3-hydroxyvalerate-3-hydroxyhexanoate), poly(3-hydroxybutyrate-co-3-hydroxyhexanoate), poly(3-hydroxybutyrate-co-3-hydroxyheptanoate), poly(3-hydroxybutyrate-co-3-hydroxyoctanoate), poly(3-hydroxybutyrate-3-hydroxynonanoate), poly-(3-hydroxybutyrate-co-3-hydroxynonanoate), poly(3-hydroxybutyrate-co-3-hydroxynonanoate), and poly(3-hydroxybutyrate-co-4-hydroxybutyrate).

From the viewpoint of the processability or the physical properties of a molded article, poly(3-hydroxybutyrate), poly(3-hydroxybutyrate-co-3-hydroxyvalerate), poly(3-hydroxybutyrate-co-3-hydroxybutyrate-3-hydroxyhexanoate), poly(3-hydroxybutyrate-co-3-hydroxyhexanoate) and poly(3-hydroxybutyrate-co-4-hydroxybutyrate) can preferably be used.

From the viewpoint of the processability 3 the productivity, or the quality of a molded article, the constitutional ratio of 3-hydroxybutyrate (3HB3) to a comonomer copolymerizable therewith (e.g., 3-hydroxyvalerate (3HV), 3-hydroxyhexanoate (31HH), or 4-hydroxybutyrate (4HB)) in the above-mentioned poly-3-hydroxyalkanoates, that is, the monomer percentage in a copolymer resin is preferably 3-hydroxybutyrate/comonomer=97/3 to 80/20 (mol %/mol %), and more preferably 95/5 to 85/15 (mol %/mol %).

The monomer percentage of each monomer in a poly-3-hydroxyalkanoate can be determined by a method known to those skilled in the art, for example, the method described in WO-A-2013/147139.

In respect that a molded article to be obtained is excellent in heat resistance, the lower limit of the poly-3-hydroxyalkanoate to be used is 25 parts by weight of more, preferably 30 parts by weight or more, based on 100 parts by weight of the total amount (A+B+C) of the three components, (A) the polylactic acid, (B) the poly-3-hydroxyalkanoate, and (C) the aliphatic-aromatic polyester. On the other hand, in respect that the resultant is excellent in the effect of suppressing the formation of burrs of a molded article to be obtained, the upper limit is 45 parts by weight or less, preferably 40 parts by weight or less, based on. 11 parts by weight of the total amount (A+B+C) of the three components, (A) the polylactic acid, (B) the poly-3-hydroxyalkanoate, and (C) the aliphatic-attic polyester.

[(C) Aliphatic-Aromatic Polyester]

The aliphatic-aromatic polyester disclosed herein is not particularly limited as long as it is a polyester containing an aliphatic compound and an aromatic compound as repeat units, but a polyester composed of an aliphatic diol, an aliphatic dicarboxylic acid, and an aromatic dicarboxylic acid is preferable. As to the aliphatic-aromatic polyester, one species thereof may be used singly or two or more species thereof may be used in combination.

Examples of the aliphatic diol as a monomer of the aliphatic-aromatic polyester disclosed herein include butanediol, examples of the aliphatic dicarboxylic acid include adipic acid, sebacic acid, azelaic acid, and succinic acid, and examples of the aromatic dicarboxylic acid include terephthalic acid.

Specific examples of the aliphatic-aromatic polyester include polybutylene adipate terephalate (PBAT), polybutylene sebacate terephthalate, polybutylene azelate terephthalate, and polybutylene succinate terephthalate.

The melting point of the aliphatic-aromatic polyester disclosed herein is preferably 100 to 130° C., and more preferably 110 to 130° C. When the melting point is less than 100° C., the heat resistance of a molded article formed from the biodegradable polyester resin composition may be lowered. When the melting point exceeds 130° C., the ductility or the toughness of a molded article formed from the biodegradable polyester resin composition may be lowered.

The molecular weight of the aliphatic-aromatic polyester disclosed herein is not particularly limited as long as the aliphatic-aromatic polyester exhibits substantially satisfactory physical properties for the intended use. However, when the molecular weight is tow: a molded article to be obtained has a lowered strength. Conversely, if the molecular weight is high, the processability deteriorates and it is difficult to form a molded article. In view of such circumstances, the weight-average molecular weight of the aliphatic-aromatic polyester disclosed herein is preferably in the range of 50,000 or more and 300,000 or less, and more preferably in the range of 100,000 or more and 200,000 or less.

The weight-average molecular weight of the aliphatic-aromatic polyester is determined from a molecular weight distribution in terms of polystyrene standards that is measured by using gel permeation chromatography (GPC) using a chloroform solution. A column used in the GPC may be any column suitable for measuring the molecular weight range above.

As the aliphatic-aromatic polyester disclosed herein a commercially available aliphatic-aromatic polyester can be used, and specifically, "Ecoflex" (registered trademark) of BASF, products of NOVAMONT, and products of Eastman Chemical Company can be used.

Regarding the amount (content) of the aliphatic-aromatic polyester used in the biodegradable polyester resin composition disclosed herein, die lower limit thereof is 5 parts by weight or more, preferably 10 parts by weight or more, based on 100 parts by weight of the total amount (A+B+C) of the three components, (A) the polylactic acid, (B) the poly-3-hydroxyalkanoate, and (C) the aliphatic-aromatic polyester in respect that the resin composition is excellent in the heat resistance, the ductility, and the toughness of a molded article to be obtained. On the other hand, in respect that the composition is excellent in processability the upper limit is 25 parts by weight or less, preferably 20 parts by weight or less, based on. 100 parts by weight of the total amount of the three components, (A) the polylactic acid, (B) the poly-3-hydroxyalkanoate, and (C) the aliphatic-aromatic polyester.

[(D) Pentaerythritol]

In the present disclosure, pentaerythritol is a kind of polyhydric alcohols and is a white crystalline organic compound having a melting point of 260.5° C. Pentaerytritol is classified as a sugar alcohol, but it is not derived from natural products and can be synthesized by condensing acetaldehyde and formaldehyde under basic conditions.

Usually the pentaerythritol disclosed, herein is not particularly limited as long as it is commonly available, and it may be one provided as a reagent or an industrial product Examples of the reagent include, but are not limited to, those produced by Wako Pure Chemical Industries, Ltd., Sigma-Aldrich, Tokyo Chemical Industries Co., Ltd., and Merck. Examples of the industrial product include, but are not limited to, one produced by Koei Chemical Co., Ltd., (trade name: Pentarit), one produced by The Nippon Synthetic Chemical. Industry Co., Ltd., (trade name: Neulizer P), one produced by Toyo Chemicals Co., Ltd., and one produced by Perstorp.

Some commercially available reagents and products contain, as impurities, oligomers generated by dehydration condensation of pentaerythritol, such as dipentaerythritol and tripentaerythritol. These oligomers are not effective for the crystallization of polyhydroxyalkanoate, but do not inhibit the crystallization effect of pentaerythritol. Therefore, the pentaerythritol may contain such oligomers.

Regarding the amount (content) of pentaerythritol used in the biodegradable polyester resin composition disclosed herein, the lower limit thereof is 0.05 parts by weight or more, preferably 0.1 parts by weight or more, and even more preferably 0.5 parts by weight or more, relative to 100 parts by weight of the total amount (A+B+C) of the three components, (A) the polylactic acid, (B) the poly-3-hydroxyalkanoate, and (C) the aliphatic-aromatic polyester in respect that it is easy to obtain the effect of pentaerythritol as a crystallization nucleating agent and processability can be improved and d the resin composition is excellent in the effect of suppressing the formation of burrs of a molded article to be obtained. On the other hand, in respect that an excellent flow characteristic of resin will be exhibited during molding, the upper limit is 20 parts by weight or less, preferably 12 parts by weight or less, and even more preferably 10 parts by weight or less, and still even more preferably S parts by weight or less, relative to 100 parts by weight of the total amount (A+B+C) of the three components, (A) the polylactic acid, (B) the poly-3-hydroxyalkanoate, and (C) the aliphatic-aromatic polyester.

[(E) Silicate]

The silicate disclosed herein is not particularly limited as long as the effect of improving heat resistance and improving processability can be obtained, but talc, mica, kaolinite, montmorillonite, smectite, or the like can be suitably used because they are highly versatile and have a high effect of improving mechanical strength and are less prone to inhibit surface smoothness or mold transferability due to their small particle diameter distribution.

Regarding the silicate, only a single species thereof may be used, or two or more species thereof may be blended and the blending ratio can be adjusted appropriately according to the types of (A) the polylactic acid, (B) the poly-3-hydroxyalkanoate, and (C) the aliphatic-aromatic polyester and the effect to be achieved.

The silicate disclosed herein may be subjected to a surface treatment in order to improve the dispersibility thereof in the biodegradable polyester resin composition. The surface treatment may be a treatment of covering at least a part of the surface of the silicate with a surface treatment agent. Examples of the surface treatment agent include a higher fatty acid, a silane coupling agent, a titanate coupling agent, a sol-gel coating agent, and a resin coating agent.

The moisture content of the silicate disclosed herein is preferably 0.01 to 10%, more preferably 0.01 to 5%, and even more preferably 0.01 to 1%, in respect that it is easy to suppress the hydrolysis of (A) the polylactic acid, (B) the poly-3-hydroxyalkanoate, and (C) the aliphatic-aromatic polyester. The moisture content is determined in accordance with JIS-K 5101.

The average particle diameter of the silicate disclosed herein is preferably 0.1 to 100 μm, more preferably 0.1 to 50 μm, and even more preferably 0.1 to 5 μm, in respect that the characteristics and the processability of the biodegradable polyester resin composition are excellent. The average particle diameter can be determined by using a laser diffraction/scattering type device, such as "Micro rac MT3100II" manufactured by Nikkiso Co., Ltd.

Since there may be a case that the silicate disclosed herein also has a function as a crystallization nucleating agent together with (D) the pentaerythritol, it is possible in this case to further promote the crystallization of the biodegradable polyester resin composition and improve the processability by making (D) the pentaerythritol coexist.

Examples of a silicate to be used for the biodegradable polyester resin composition, of the present disclosure are provided below. When tale is used as the silicate, examples thereof include general-purpose talc and surface-treated talc, and specifically include "MICRO ACE" (registered trademark) available from Nippon Talc Co., Ltd., "Talcan Pawder" (registered trademark) available from Hayashi Kasei Co., Ltd., and tales available form Takehara Kagaku Kogyo Co., Ltd. and Maruo Calcium Co., Ltd.

When mica is used, examples thereof include wet-pulverized mica and dry-pulverized mica, and specifically include micas a available from Yamaguchi Mica Co., Ltd., Keiwa Rozai Co., Ltd., etc.

When kaolinite is used, examples thereof include dr kaolin, calcined kaolin, and wet kaolin, and specifically include "TRANSLINK" (registered trademark), "ASP" (registered trademark), "SANTINTONE" (registered trademark), and "ULTREX" (registered trademark) available from Hayashi Kasei Co., Ltd. and kaolinite available from Keiwa Rozai Co., Ltd.

Regarding the amount (content) of (E) the silicate used in the biodegradable polyester resin composition disclosed herein, the lower limit thereof is 10 parts by weight or more, preferably 15 parts by weight or more, and more preferably 20 parts by weight or more, relative to 100 parts by weight of the total amount (A+B+C) of the three components, (A) the polylactic acid, (B) the poly-3-hydroxyalkanoate, and (C) the aliphatic-aromatic polyester in respect that a molded article to be obtained is excellent in heat resistance. On the other hand, in respect that the composition is excellent in processability the upper limit is 40 parts by weight or less, preferably 35 parts by weight or less, and more preferably 30 parts by weight or less, relative to 100 parts by weight of the total amount (A+B+C) of the three components, (A) the polylactic acid, (B) the poly-3-hydroxyalkanoate, and (C) the aliphatic-aromatic polyester.

[(F) Compatibilizer Having Epoxy Group]

Examples of the compatibilizer having an epoxy group used in the biodegradable polyester resin composition disclosed herein include a glycidyl (meth)acrylate compound, a glycidyl ether compound, a gycidyl ester compound, a glycidyl amine compound, a glycidyl imide compound, and an alicyclic epoxy compound.

The epoxy equivalent of the compatibilizer having an epoxy group disclosed herein is 100 to 1000 g/mol, preferably 200 to 500 g/mol, in respect that it is easy to improve the toughness and ductility of a molded article obtained by molding the biodegradable polyester resin composition disclosed herein.

The epoxy equivalent is determined in accordance with JIS-K 7236.

As the compatibilizer having an epoxy group disclosed herein, commercially available compatibilizers having an epoxy group can be used. Specifically, "JONCRYL" (registered trademark) available from BASF, "RESEIDA" (registered trademark) and "ARUFON" (registered trademark) available from Toagosei Co., Ltd., "BIOMAX" (registered trademark) available from DuPont, "LOTADER" (registered trademark) available from ARKEMA, etc. can be used.

The amount (content) of the compatibilizer having an epoxy group used in the biodegradable polyester resin composition disclosed herein is preferably 0 to 3 parts by weight, more preferably 0.5 to 2 parts by weight, relative to 100 parts by weight of the total amount (A+B+C) of the three components, (A) the polylactic acid. (B) the poly-3-hydroxyalkanoate, and (C) the aliphatic-aromatic polyester. The amount of the compatibilizer may be 0 parts by weight, but the use of a compatibilizer in combination may afford better ductility and toughness in some cases. In respect that the resin composition is excellent in ductility and toughness, the upper limit of the compatibilizer haring an epoxy group is preferably 3 parts by weight or less, more preferably 2 parts by weight or less, and even more preferably 1 part by weight or less, relative to 100 parts by weight of the total amount (A+B+C) of the three components, (A) the polylactic acid, (B) the poly-3-hydroxyalkanoate, and (C) the aliphatic-aromatic polyester. When the amount of the compatibilizer having an epoxy group used is more than 3 parts by weight, epoxy groups of the compatibilizer react with each other so that the effect of improving ductility and toughness may deteriorate.

[Optional Components]

The biodegradable polyester resin composition disclosed herein may include, in addition to (A) the polylactic acid, (B) the poly-3-hydroxyalkanoate, (C) the aliphatic-aromatic polyester (D) the pentaerythritol, (E) the silicate and, if necessary, (F) the compatibilizer having an epoxy group, other components such as an antioxidant; a UV absorber; a coloring agent such as a dye and a pigment; a plasticizer a lubricant; an inorganic filler; an organic filler; or an antistatic agent. The addition amounts of such other components are not particularly limited as long as they do not impair the effect of the present invention.

[Method for Producing Biodegradable Polyester Resin Composition]

The biodegradable polyester resin composition disclosed herein can be produced easily by using any known kneading machine that is a device capable of heating (A) the polylactic acid, (B) the poly-3-hydroxyalkanoate, and (C) the aliphatic-aromatic polyester disclosed herein to temperatures t al to or higher than their melting points and kneading them. For example, it is possible to use a method in which (A) the polylactic acid, (B) the poly-3-hydroxyalkanoate, (C) the aliphatic-aromatic polyester (ID) the pentaerythritol, (E) the silicate and, if necessary (F) the compatibilizer having an epoxy group and other optional components are melt-kneaded by an extruder, a kneader, a roll mill, a Banbury mixer, or the like, and thereby formed into pellets, and a method in which a high concentration master batch of (D) the pentaerythritol and (E) the silicate is prepared beforehand, then blended with (A) the polylactic acid, (B) the poly-3-hydroxyalkanoate, (C) the aliphatic-aromatic polyester, (ID) the pentaerythritol, (E) the silicate and, if necessary, (F) the compatibilizer having an epoxy group and other optional components at a desired ratio, and then melt-kneaded.

In addition, (A) the polylactic acid, (t) the poly-3-hydroxyalkanoate, (C) the aliphatic-aromatic polyester, (D) the pentaerythritol, (E) the silicate and, if necessary, (F) the compatibilizer having an epoxy group may be added to the kneading machine at the same time, or (A) the polylactic acid, (B) the poly-3-hydroxyalkanoate. (C) the aliphatic-aromatic polyester and, if necessary (F) the compatibilizer having an epoxy group may be melted first, and then (D) the pentaerythritol and (E) the silicate may be added thereto.

It is preferable to add (E) the silicate at last in respect that the properties of a resin composition or a molded body to be obtained are not deteriorated. That is, it is preferable to add (E) the silicate to a resin composition prepared by melt-kneading (A) the polylactic acid, (B) the poly-3-hydroxyalkanoate. (C) the aliphatic-aromatic polyester, (D) the pentaerythrtol and, if necessary, (F) the compatibilizer having an epoxy group at an intended ratio, Generally, among (E) the silicates, talc and mica contain moisture and indicate alkalinity Therefore, if such talc or mica is made to coexist with (A) the polylactic acid, (B) the poly-3-hydroxyalkanoate, or (C) the aliphatic-aromatic polyester at high temperatures, the decomposition of the polyester may be facilitated, and thereby the mechanical properties of a molded body formed from a biodegradable polyester resin composition may deteriorate.

Specifically; for example, in the case of preparing a resin composition with a co-rotating intermeshing twin-screw extrude; it is preferable to add (A) the polylactic acid, (B) the poly-3-hydroxyalkanoate, (C) the aliphatic-aromatic polyester, (D) the pentaerythritol and, if necessary, (F) the compatibilizer having an epoxy group at the root of the screws and add (E) the silicate at the downstream of the extruder by side feeding or the like.

In the above, the temperature at which (A) the polylactic acid, (B) the poly-3-hydroxyalkanoate, (C) the aliphatic-aromatic polyester, (D) the pentaerythritol, (E) the silicate and, if necessary, (F) the compatibilizer having an epoxy group are melt-kneaded cannot be absolutely specified because it depends on the melting points, melt-viscosities, etc. of (A) the polylactic acid, (B) the poly-3-hydroxyalkanoate, and (C) the aliphatic-amniotic polyester to be used, but the resin temperature of the melt-kneaded matter at the die outlet is preferably 160 to 200° C., more preferably 165 to 195° C., and even more preferably 170 to 190° C. If the resin temperature of the melt-kneaded matter is lower than 160° C., (A) the polylactic acid or (B) the poly-3-hydroxyalkanoate or (C) the aliphatic-aromatic polyester may remain unmelted, whereas if the resin temperature exceeds 200° C., there is a possibility that (B) the poly-3-hydroxyalkanoate is outstandingly decomposed by heat.

[Method for Producing Molded article Formed from Biodegradable Polyester Resin Composition]

Examples of the method for producing a molded body formed from the biodegradable polyester resin composition disclosed herein are described below. First, (A) the polylactic acid, (B) the poly-3-hydroxyalkanoate, (C) the aliphatic-aromatic polyester, (D) the pentaerythritol, (E) the silicate and, if necessary. (F) the compatibilizer having an epoxy group and other optional components are added into, and melt-kneaded by an extrude; a kneader, a Banbury mixer, rolls, or the like to prepare a biodegradable polyester resin composition, which is then extruded in the form of a strand and then cut to obtain pellets of the biodegradable polyester resin composition having a particle shape such as a columnar shape, an elliptical columnar shape, a spherical shape, a cubic shape, or a rectangular parallelepiped shape.

The pellets prepared by the above method are sufficiently dried at 40 to 80° C. to remove moisture therefrom, and then may be molded by a known molding processing method. In this manner, an intended molded article can be obtained.

The molding temperature during molding will be described. The molten resin temperature of the biodegradable polyester resin composition disclosed herein is preferably 160 to 200° C., and more preferably 170 to 190° C., from the viewpoint of excellent appearance such as difficulty in coloring. The cooling temperature after melting the biodegradable polyester resin composition disclosed herein is preferably 25 to 55° C., more preferably 30 to 50° C., and even more preferably 30 to 40° C. When the cooling temperature is lower than 25° C., the crystallization of (B) the poly-3-hydroxyalkanoate component in the biodegradable polyester resin composition is delayed, so that productivity may be decrease in some cases. When the cooling temperature exceeds 55° C., it is to be higher than the glass transition point of (A) the polylactic acid component in the biodegradable polyester resin composition, so that the elastic modulus is lowered and it becomes difficult to remove a product from the mold, and moreover the crystallization of (C) the aliphatic-aromatic polyester component is delayed, so that productivity may decrease in some cases.

Examples of the molding processing method include injection molding, extrusion forming, film forming, sheet forming, blow molding, fiber spinning, extrusion foaming, and expanded bead molding.

As a method for producing an injection-molded article, there can be employed injection molding methods such as an injection molding method commonly used to mold a thermoplastic resin, a gas assist molding method, and an injection compression molding method. In addition, according to intended use, any injection molding method other than the above methods is adoptable, such as an n-mold molding method, a gas press molding method, a two-color molding method, a sandwich molding method, PUSH-PULL, or SCORIM, However, it should be noted that adoptable injection molding methods are not limited to these examples.

There is a gap at a joint between cavities of a mold for injection molding (e.g., parting line portion, insertion portion, and slide co e sliding portion), and theretofore "burrs" formed from a molten resin entering into the gap during injection molding is heretofore to be attached to a molded product. Especially, a poly-3-hydroxyalkanoate crystallizes slowly and the resin has flowability for a long period of time, and therefore burrs are likely to be formed and post-processing of a molded product requires a lot of effort. The biodegradable polyester resin composition of the present invention containing (A) the polylactic acid, (B) the poly-3-hydroxyalkanoate, (C) the aliphatic-aromatic polyester, (D) the pentaerythritol, (E) the silicate and, if necessary, (F) the compatibilizer having an epoxy group is preferred from a practical viewpoint because it is quickly crystallized, and therefore burr is less likely to be formed and effort required for post-processing of a molded product can be reduced.

Examples of a method for producing a film-formed article include film-forming methods such as T-die extrusion forming, calendaring, roll forming, and inflation molding. However, the film-forming method is not limited to these examples. In addition, a film obtained from the biodegradable polyester resin composition disclosed herein can be subjected to thermoforming by heating, vacuum forming, or press molding.

The biodegradable polyester resin composition according to the present invention is excellent in terms of heat resistance, ductility toughness, and processability, and it can be processed in a short time and is suitable for use as a base material of, for example, tableware, agricultural materials, marine materials, parts for OA equipment, parts for home appliances, automobile components, daily sundries, stationer, various molded bottles, extruded sheets, and profile-extruded products.

EXAMPLES

In the following, the present invention will be specifically described with reference to examples, but the technical scope of the present invention is not limited by these examples.

(A) Polylactic Acid: The following products were used.
PLA-1: Ingeo 3251D produced by NatureWorks LLC
PLA-2: Ingeo 10361D manufactured by Nature Works LLC
(B) Poly-3-hydroxyalkanoate: The products obtained in the following production examples and commercial products were used.
P3HA-1: The product obtained in Production Example 1 was used.

Production Example 1

P3HB3FHH having a 3-hydroxyhexanoate (3HH) composition of 5.6 mol % and a 3-hydroxybutyrate (3HB) composition of 94.4 mol % was obtained using KNK-005 stain and palm oil as a carbon source according to the method disclosed in WO 2013/147139. The weight-average molecular weight measured by GPC was 600,000.

P3HA-2: The product obtained in Production Example 2 was used.

Production Example 2

P3HB3HH, a source poly-3-hydroxyalkanoate A2, was obtained using KNK-631 stain and palm kernel oil as a carbon source according to the method disclosed in WO 2013/147139. The weight-average molecular weight thereof was 650,000, the 3HH composition was 11.4 mol %, and the 3HB composition was 88.6 mol %.

P3HA-3: The product obtained in Production Example 3 was used.

Production Example 3

Using C. necator H16 strain (ATCC 1.7699) as a production strain, P3HB having a weight-average molecular weight of 850,000 was prepared according to WO 09/145164.

P3HA-4: P3HB4HB (EM5400 produced by Ecomann)

Other substances used in examples and comparative examples are show below.

(C) Aliphatic-Aromatic Polyester: The following products were used.

Ecoflex C1200 produced by BASF SE (D) Pentaerythritol: The following products were used.

Neulizer P produced by The Nippon Synthetic Chemical industry Co., Ltd.

(E) Silicate: The following products were used.

Silicate-1: Talc (MICRO ACE K-1, produced by Nippon Talc Co., Ltd.)

Silicate-2: Mica (A-21 S produced by Yamaguchi Mica Co., Ltd.)

(F) Compatibilizer Having Epoxy Group: The following products were used.

JONCRYLADR-4368 produced by BASF SE

Example 1

(Production of Biodegradable Polyester Resin Composition)

PLA-1 as (A) a polylactic acid, P3HA-L as (B) a poly-3-hydroxyalkanoate, Ecoflex C1200 as (C) an aliphatic-aromatic polyester, Neulizer P as (D) a pentaerythritol silicate-1 (talc) as (E) a silicate were melt-kneaded at a blending ratio shown in Table 1 (hereinafter blending ratios shown in tables are expressed in part(s) by weight) by using a co-rotating intermeshing twin-screw extruder (TEM-26SS manufactured by Toshiba Machine Co., Ltd.) at a set temperature of 160 to 180° C. and a screw rotation speed of 100 rpm to obtain a biodegradable polyester resin composition. At is this time, talc was fed from the downstream of the extruder using a side feeder. The resin temperature (determined by measuring molten resin discharged from a die, directly with a K type thermocouple) was 189° C. The molten resin composition was taken out through a die into a strand form and was cat into a pellet form. The pellets obtained were dehumidified at 80° C. and moisture was thereby removed therefrom.

(Production of Molded article Formed from Biodegradable Polyester Resin Composition)

Injection molding was performed using the obtained pellets as a raw material and using an injection molding machine (PLASTAR Si-100 IV manufactured by Toyo Machinery & Metal Co., Ltd.), and thus multipurpose test pieces conforming to ISO 3167 Type A were formed. The set temperature of the cylinder of the molding machine was 160 to 190° C., and the set temperature of the mold was 30° C. Using the multipurpose test pieces obtained, the following evaluations were carried out. The results are shown in Table 1.

(Deflection Temperature Under Load)

After storing a multipurpose test piece in an atmosphere with a temperature of 23° C. ad a humidity of 50% for one month, the piece was cut into a prescribed size and was subjected to measurement of deflection temperature under load in accordance with ISO 75, and thus a deflection temperature under load was measured.

(Tensile Elongation at Break)

After storing a multipurpose test piece in an atmosphere with a temperature of 23° C. and a humidity of 50% for one month, it was subjected to tensile breakage measurement in accordance with ISO 527, and thus a tensile elongation at break was measured.

(Impact Strength)

After storing a multipurpose test piece in an atmosphere with a temperature of 23° C. and a humidity of 50% for one month, it was subjected to notchless Charpy impact test in accordance with ISO 179, and thus an impact strength (Charpy impact strength) was measured.

(Evaluation of Burr)

A test piece obtained in the production of a molded article formed from the biodegradable polyester resin composition was visually observed, and a case where there are no bunts is expressed by "absent", and a case where there are burrs is expressed by"present".

Examples 2 to 9, Comparative Examples 1 to 8

Pellets of biodegradable polyester resin compositions and multipurpose test pieces were prepared in the same manner as in Example 1 at blending ratio as shown in Table 1 and the same evaluations as those in Example 1 were carried out. The results are shown in Table 1.

TABLE 1

Formulation of biodegradable polyester resin composition and evaluation of molded body (Blending unit part(s) by weight)

| | | Example 1 | Example 2 | Example 3 | Example 4 | Example 5 | Example 6 | Example 7 | Example 8 | Example 9 |
|---|---|---|---|---|---|---|---|---|---|---|
| Formu- | (A) PLA-1 | 40 | | 45 | 45 | 45 | 40 | 40 | 40 | 40 |
| lation | (A) PLA-2 | | 40 | | | | | | | |
| | (B) P3HA-1 | 40 | 40 | | | | 40 | 40 | | |
| | (B) P3HA-2 | | | 40 | | | | | | 40 |

TABLE 1-continued

Formulation of biodegradable polyester resin composition and evaluation of molded body (Blending unit part(s) by weight)

|  |  | 1 | 2 | 3 | 4 | 5 | 6 | 7 | 8 | 9 |
|---|---|---|---|---|---|---|---|---|---|---|
|  | (B) P3HA-3 |  |  |  | 30 |  |  |  |  | 40 |
|  | (B) P3HA-4 |  |  |  |  | 45 |  |  |  |  |
|  | (C) Aliphatic-aromatic polyester | 20 | 20 | 15 | 25 | 10 | 20 | 20 | 20 | 20 |
|  | (D) Pentaerythritol | 1 | 1 | 1.5 | 1.5 | 1.5 | 1 | 1 | 1 | 1 |
|  | (E) Silicate-1 | 30 | 30 | 30 |  | 35 | 30 |  |  |  |
|  | (E) Silicate-2 |  |  |  | 30 |  |  | 30 | 30 | 20 |
|  | (F) Compatibilizer |  |  |  |  |  | 1 | 1 | 1 | 1 |
| Evaluation | Deflection temperature under load (°C.) | 79 | 74 | 72 | 75 | 71 | 79 | 83 | 81 | 80 |
|  | Tensile elongation at break (%) | 5 | 5 | 5 | 6 | 6 | 8 | 7 | 7 | 6 |
|  | Charpy impact strength (kJ/m$^2$) | 49 | 57 | 47 | 55 | 62 | 70 | 68 | 67 | 58 |
|  | Burr | absent | absent | absent | absent | absent | absent | absent | absent | absent |

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Formulation | (A) PLA-1 | 100 | 100 | 60 | 80 |  | 40 | 40 | 75 |
|  | (A) PLA-2 |  |  |  |  |  |  |  |  |
|  | (B) P3HA-1 |  |  | 40 |  | 80 | 40 | 40 | 20 |
|  | (B) P3HA-2 |  |  |  |  |  |  |  |  |
|  | (B) P3HA-3 |  |  |  |  |  |  |  |  |
|  | (B) P3HA-4 |  |  |  |  |  |  |  |  |
|  | (C) Aliphatic-aromatic polyester |  |  |  | 20 | 20 | 20 | 20 | 5 |
|  | (D) Pentaerythritol |  | 1 | 1 | 1 | 1 |  | 1 | 1 |
|  | (E) Silicate-1 |  | 30 | 30 | 30 | 30 | 30 |  | 30 |
|  | (E) Silicate-2 |  |  |  |  |  |  |  |  |
|  | (F) Compatibilizer |  |  |  |  |  |  |  |  |
| Evaluation | Deflection temperature under load (°C.) | 54 | 56 | 79 | 55 | 97 | 75 | 56 | 56 |
|  | Tensile elongation at break (%) | 4 | 2 | 2 | 6 | 5 | 4 | >20 | 3 |
|  | Charpy impact strength (kJ/m$^2$) | 22 | 29 | 27 | 59 | 48 | 58 | 41 | 32 |
|  | Burr | absent | absent | absent | absent | absent | absent | absent | absent |

As shown in Table 1, in Comparative Example 0.1, in which only a polylactic acid was used, the deflection temperature under load was low the tensile elongation at break was low, and the impact strength was also low, whereas Examples 1 to 9 are excellent in deflection temperature under load, elongation at break, and impact strength, and no burrs are formed on the test pieces.

In Comparative Example 2, in which neither a poly-3-hydroxyalkanoate nor an aliphatic-aromatic polyester is contained, the deflection temperature under load is low, the tensile elongation at break, is low, and the impact strength is also low. In Comparative Example 3 containing no aliphatic-aromatic polyester, the tensile elongation at break was low and the impact strength was low. In Comparative Example 4 containing no poly-3-hydroxyalkanoate, the deflection temperature under load was low, and in Comparative Example 5 containing no polylactic acid, burrs were generated in the molded article. In Comparative Example 6 containing no pentaerythritol, burrs were generated in the molded article, and in Comparative Example 7 containing no silicate, the deflection temperature under load was low. Comparative Example 8 in which the ratio of (A) the polylactic acid to (B) the poly-3-hydroxyalkanoate and (C) the aliphatic-aromatic polyester is outside the range of the present invention, the deflection temperature under load was low, the tensile elongation at break was low, and the impact strength was also low.

Example 10

Pellets of a biodegradable polyester resin composition were prepared in the same manner as in Example 1 at a blending ratio as shown in Table 2. A 1 mm-thick sheet was obtained using the obtained pellets as a raw material and using a single screw extruder (Laboplast Mill, Model 20C200, manufactured by Toyo Seiki Seisaku-sho) equipped with a T-shaped die having a lateral width of 150 mm and a lip width of 1.5 mm. The set temperature of a cylinder was set to 160 to 180° C., and the set temperature of a chill roll was set to 45° C. The heat sag of the resulting sheet was evaluated, and the results are shown in Table 2.

(Evaluation of Heat Sag)

The sheet obtained by extrusion forming was stored for one month in an atmosphere with a temperature of 23° C. and a humidity of 50%. Thereafter, a strip-shaped test piece having a width of 12.7 mm and a length of 75 mm was punched out of the sheet. The strip-shaped test piece was subjected to a heat sag test in accordance with JIS K 7195 (except the thickness and the length). When the sag of the sheet was 10 mm or less at a test temperature of 60° C., the result was evaluated as "good", and when the sag of the sheet was more than 1.0 mm, the result was evaluated as "poor".

Comparative Examples 9 to 11

Pellets and sheets of biodegradable polyester resin compositions were prepared in the same manner as in Example 10 at a blending ratio as shown in Table 2, and a heat sag test was carried out. The results are shown in Table 2

TABLE 2

Formulation of biodegadable polyester resin composition and evaluation of molded article
(Blending unit part(s) by weight)

|  |  | Example 10 | Example 10 | Comparative Example 9 | Comparative Example 10 | Comparative Example 11 |
|---|---|---|---|---|---|---|
| Formulation | (A) pLA-1 | 40 | 100 | 100 | 80 |
|  | (A) PLA-2 |  |  |  |  |
|  | (B) P3HA-1 | 40 |  |  |  |
|  | (B) P3HA-2 |  |  |  |  |
|  | (B) P3HA-3 |  |  |  |  |
|  | (B) P3HA-4 |  |  |  |  |
|  | (C) Aliphatic-aromatic polyester | 20 |  |  | 20 |
|  | (D) Pentaerythritol | 1 |  | 1 | 1 |
|  | (E) Silicate-1 | 10 |  | 30 | 30 |
|  | (E) Silicate-2 |  |  |  |  |
|  | (F) Compatibilizer |  |  |  |  |
| Evaluation | Heat sag | good | poor | poor | poor |

As shown in Table 2, in Comparative Example 9, in which only a polylactic acid was used, or Comparative Examples 10 and 11, in which no poly-3-hydroxyalkanoate was contained, the sheets sagged, whereas in Example 10, the sheet did not sag and was good in heat resistance.

The resin composition of the present invention improves the heat resistance, ductility, and toughness which are faults of molded articles formed from polylactic acid, the processability such as injection molding and extrusion molding is improved, and molding defects such as burrs are less likely to occur.

The invention claimed is:

1. A biodegradable polyester resin composition, comprising:
    30 parts by weight or more and 60 parts by weight or less of (A) a polylactic acid;
    25 parts by weight or more and 45 parts by weight or less of (B) a poly-3-hydroxyalkanoate; and
    5 parts by weight or more and 25 parts by weight or less of (C) an aliphatic-aromatic polyester,
    based on 100 parts by weight in total of (A) the polylactic acid, (B) the poly-3-hydroxyalkanoate, and (C) the aliphatic-aromatic polyester,
    wherein the biodegradable polyester resin composition further comprises, relative to 100 parts by weight in total of (A) the polylactic acid, B) the poly-3-hydroxyalkanoate, and (C) the aliphatic-aromatic polyester:
    0.05 part by weight or more and 20 parts by weight or less of (D) pentaerythritol;
    10 parts by weight or more and 40 parts by weight or less of (E) a silicate; and
    0 part by weight or more and 3 parts by weight or less of (F) a compatibilizer having an epoxy group.

2. The biodegradable polyester resin composition according to claim 1, wherein (E) the silicate is at least one selected from the group consisting of talc, mica, kaolinite, montmorillonite, and smectite.

3. The biodegradable polyester resin composition according to claim 1, wherein (C) the aliphatic-aromatic polyester has a melting point of 100 to 130° C. and is at least one selected from the group consisting of polybutylene adipate terephthalate, polybutylene sebacate terephthalate, polybutylene azelate terephthalate, and polybutylene succinate terephthalate.

4. The biodegradable polyester resin composition according to claim 1, wherein (B) the poly-3-hydroxyalkanoate is at least one selected from the group consisting of poly(3-hydroxybutyrate), poly(3-hydroxybutyrate-co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

5. A biodegradable polyester resin molded article, produced by melting the biodegradable polyester resin composition according to claim 1 and molding the melted biodegradable polyester resin composition at 25 to 55° C.

6. The biodegradable polyester resin composition according to claim 1, wherein (A) the polylactic acid has a weight-average molecular weight in a range of 50,000 or more and 300,000 or less.

7. The biodegradable polyester resin composition according to claim 1, comprising:
    40 parts by weight or more and 50 parts by weight or less of (A) the polylactic acid;
    30 parts by weight or more and 40 parts by weight or less of (B) the poly-3-hydroxyalkanoate;
    10 parts by weight or more and 20 parts by weight or less of (C) the aliphatic-aromatic polyester;
    0.1 part by weight or more and 12 parts by weight or less of (D) pentaerythritol;

15 parts by weight or more and 35 parts by weight or less of (E) the silicate; and 0.5 part by weight or more and 2 parts by weight or less of (F) the compatibilizer having an epoxy group.

8. The biodegradable polyester resin composition according to claim 7, comprising:

0.5 part by weight or more and 10 parts by weight or less of (D) pentaerythritol;

20 parts by weight or more and 30 parts by weight or less of (E) the silicate; and 0.5 part by weight or more and 1 parts by weight or less of (F) the compatibilizer having an epoxy group.

9. The biodegradable polyester resin composition according to claim 1, wherein (C) the aliphatic-aromatic polyester has a weight-average molecular weight in a range of 50,000 or more and 300,000 or less.

10. The biodegradable polyester resin composition according to claim 1, wherein (C) the aliphatic-aromatic polyester has a melting point of 110 to 130° C.

11. The biodegradable polyester resin composition according to claim 1, wherein (B) the poly-3-hydroxyalkanoate is a polymeric resin containing 80 mol % or more of a monomer unit of 3-hydroxybutyrate.

12. The biodegradable polyester resin composition according to claim 1, wherein (B) the poly-3-hydroxyalkanoate is a polymeric resin containing 85 mol % or more of a monomer unit of 3-hydroxybutyrate.

13. The biodegradable polyester resin composition according to claim 1, wherein (E) the silicate is at least one selected from the group consisting of talc and mica.

14. The biodegradable polyester resin composition according to claim 1, wherein (B) the poly-3-hydroxyalkanoate is at least one selected from the group consisting of poly(3-hydroxybutyrate), poly(3-hydroxybutyrate co-3-hydroxyvalerate), poly(3-hydroxybutyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate), (C) the aliphatic-aromatic polyester has a melting point of 100 to 130° C. and is at least one selected from the group consisting of polybutylene adipate terephthalate, polybutylene sebacate terephthalate, polybutylene azelate terephthalate, and polybutylene succinate terephthalate, and (E) the silicate is at least one selected from the group consisting of talc, mica, kaolinite, montmorillonite, and smectite.

15. The biodegradable polyester resin composition according to claim 7, wherein (E) the silicate is at least one selected from the group consisting of talc, mica, kaolinite, montmorillonite, and smectite.

16. The biodegradable polyester resin composition according to claim 7, wherein (C) the aliphatic-aromatic polyester has a melting point of 100 to 130° C. and is at least one selected from the group consisting of polybutylene adipate terephalate, polybutylene sebacate terephthalate, polybutylene azelate terephthalate, and polybutylene succinate terephthalate.

17. The biodegradable polyester resin composition according to claim 7, wherein (B) the poly-3-hydroxyalkanoate is at least one selected from the group consisting of poly(3-hydroxybutyrate), poly(3-hydroxybutyrate-co-3-hydroxyvalerate), poly(3-hydroxy butyrate-co-3-hydroxyvalerate-co-3-hydroxyhexanoate), poly(3-hydroxybutyrate-co-3-hydroxyhexanoate), and poly(3-hydroxybutyrate-co-4-hydroxybutyrate).

18. The biodegradable polyester resin composition according to claim 7, wherein (A) the polylactic acid has a weight-average molecular weight in a range of 50,000) or more and 300,000 or less.

19. The biodegradable polyester resin composition according to claim 7, wherein (C) the aliphatic-aromatic polyester has a weight-average molecular weight in a range of 50,000 or more and 300,000 or less.

20. The biodegradable polyester resin composition according to claim 7, wherein (C) the aliphatic-aromatic polyester has a melting point of 110 to 130° C.

* * * * *